F. STARR.
TOY VEHICLE.
APPLICATION FILED SEPT. 30, 1919.

1,368,066.

Patented Feb. 8, 1921.

INVENTOR.
Fred Starr
BY John H Miller
Geo J Henry
ATTORNEYS.

UNITED STATES PATENT OFFICE.

FRED STARR, OF OAKLAND, CALIFORNIA.

TOY VEHICLE.

1,368,066.      Specification of Letters Patent.      Patented Feb. 8, 1921.

Application filed September 30, 1919. Serial No. 327,532.

*To all whom it may concern:*

Be it known that I, FRED STARR, a citizen of the United States, and resident of the city of Oakland, county of Alameda, State of California, have invented new and useful Improvements in Toy Vehicles, of which the following is a specification.

My invention has for its object an easily operable, substantially constructed, safe and convenient toy vehicle, as for example, a three or four wheeled vehicle of usual form. This I accomplish by providing propelling means operated by the movement of handle bars in both directions, the said handle bars at the same time serving to steer the said vehicle, the steering being accomplished by swiveling the steering column to the main frame of the vehicle, the steering column being in engagement with a wheel, or wheels, of the vehicle, and the propelling means, also actuated from the handle bars, being in engagement through suitable mechanism with the propelling wheel or wheels.

By referring to the figures my invention will be made clear.

Figure 1:
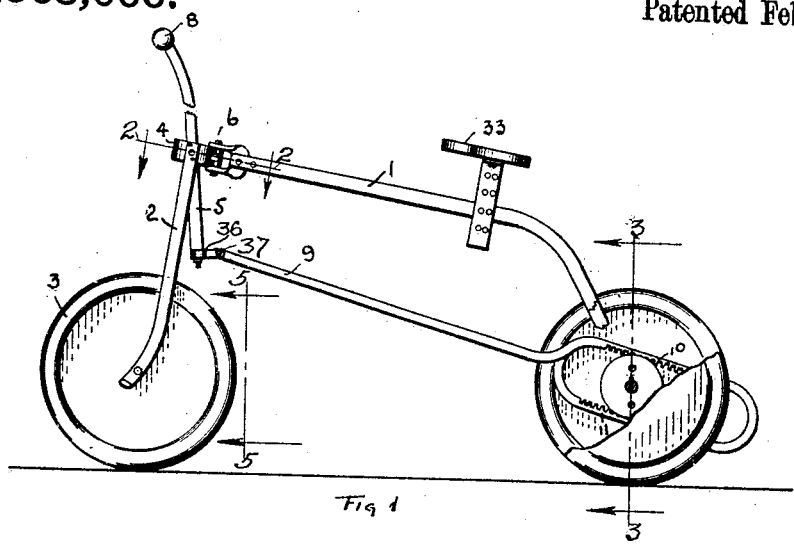
Figure 1 is a side view of a vehicle within which is incorporated my invention, one of the rear wheels being partly broken away to show the arrangement of propelling means.
Figure 2:
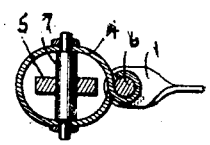
Fig. 2 is a detailed cross section through steering column showing its connection with the frame body and handle bar lever.
Figure 3:
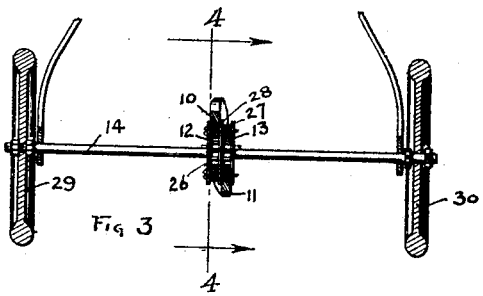
Fig. 3 is a cross section through the rear axle and racks, with the clutch gears shown in view.

Although I have shown my invention as applied to a three wheeled vehicle or velocipede, it is to be understood that it is applicable to other forms and constructions, and I wish to be understood as claiming all such.

Throughout the figures the same numerals refer to similar parts.

The numeral 1 is the body frame and 2 is the steering column carrying the wheel 3 in rotative engagement therewith, the upper part of which steering column is provided with a member as 4, within which is pivoted the lever 5. The member 4 is swiveled to the body frame 1 by the king bolt 6. The lever 5 is carried on the pivot 7 so that the swinging movement of the handle bars 8 will cause a corresponding swinging movement of the lever 5, pivot 7, member 4, column 2, and steering wheel 3, thereby steering the vehicle through the swinging movement of the handle bars 8. The lever 5 is swiveled at 36 as by a universal joint, whereby a freedom of rotary movement of 5 for steering at 36 and a hinge movement for propelling at 37 is attained. The lever 5 engages the connecting rod 9 carrying the racks 10 and 11, which engage respectively the gears 12 and 13. These gears are loosely mounted on the axle 14 and concentric with their interior clutch surface 15 are the clutch members 16. These clutch members are provided with jaws 17, 18, springs 19, 20, and pawls, or dogs, 21, 22 which are held in wedge relation between the clutch surface 15 and the jaws 23, 24 respectively by the springs 19, 20. These pawls or dogs as here shown consist of steel disks, which form provides a simple, cheap and efficient pawl means. The members 16 are fixed upon the axle 14, as by the keys 25. Side plates 26 and 27, and spacing plate 28 form retainers for the racks 10, 11. It will be seen that the two gears and their contained pawl mechanism are exact duplicates and that upon any rack movement one will rotate in one direction and the other in the reverse and that therefore one will clutch with the axle and the other rotate freely thereon; and that upon a reversal of the rack movement the opposite gear will clutch to the axle and the first one be reversed and freely move on the axle. Mounted on the axle 14 is the driving wheel 29, and a second or a loose wheel 30, may also be carried therewith. One of these wheels preferably the loose wheel, may be provided with the plate 31 carrying a series of holes, one at least of which, 32, should be located centrally; the others may be located off center, so that the axle may be inserted in any of these holes, the wheel thus being caused to rotate truly or eccentrically, as the case may be, upon the said axle, in the first place producing a smoothly rolling movement of the vehicle and in the second a rocking movement. Or both wheels 29, 30, may be provided with eccentrically located axle holes, or both may be fixed upon the axle 14, so that the forward movement of the vehicle is accompanied by a rocking motion simulating the well known rocking hobby horse.

Figure 4:
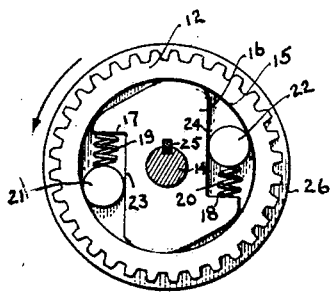
Fig. 4 is a detail of the mechanism of one of the clutches.
Figure 5:
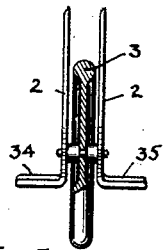
Fig. 5 is a part view and part section of the steering wheel with foot pedals formed from the steering column.
Figure 6:
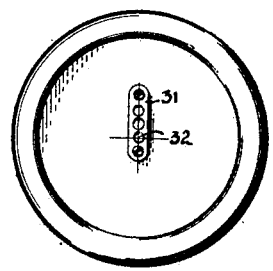
Fig. 6 is a detail view of one of the rear wheels, showing means for producing a rocking movement in the toy as it is propelled.
Figure 7:
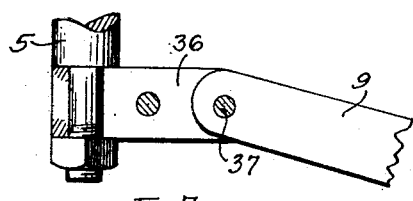
Fig. 7 is a longitudinal vertical section through the swivel connection of the lever 5.

The operation is as follows:

The handle bars 8 are reciprocated by the child from the seat 33, thereby causing movement of the connecting rod 9, and parallel synchronous movements of the racks 10 and 11, and therefore alternating opposite movements of the gears 12 and 13. One of the said gears will upon any single movement in one direction engage the pawls, or dogs, 21, 22, through the action of the springs 19 and 20, between the gear circular surface 15 and the jaw surfaces 23, 24, thus causing the gear to carry with it when it is rotated in the direction of the arrow of Fig. 4, the member 16 and axle 14, together with wheel 29, thus propelling the vehicle. When a reverse movement of the handle bars is made the connecting rod 9 and racks 10 and 11 travel in the same direction, while the gears with which they mesh rotate in opposite directions. One of these gears engages its dogs, or pawls, causing rotation of the axle 14, and upon a reverse of the handle bar movement the other gear and clutch operates to continue in the same direction as before, although the movement of the handle bars has been reversed. At such time the clutch which first operated will not be in engagement, the gear being operated in a direction reverse to the arrow of Fig. 4 and the pawls 21 and 22 at such time permitting free reverse movement. At 34, 35 I form suitable foot rests from the steering column 2.

I claim:

1. In a velocipede, of a frame, a steering wheel, a pivoted mounting connecting the steering wheel with the frame, a handle bar extending through said pivoted mounting and swiveled at its lower end to a connecting rod, said connecting rod being provided with racks laterally displaced and each engaging clutch means adapted to relative reverse movement, each of said clutches being provided with means constructed and adapted to turn a driving axle in a single direction and permitting free rotation on said axle in the opposite direction.

2. In a wheeled toy, the combination with a body frame, of a steering wheel, a member pivoted to said frame, a steering column having bearings for said wheel and pivoted to said member, a pivot extending across said member, a handle bar supported by said pivot and swiveled at its lower end to a connecting rod, said rod having racks, a rear axle and wheels, and clutch means on said axle for engagement with said racks, said clutch means being constructed to turn the axle in one direction only and to permit its free rotation in the opposite direction.

3. In a wheeled toy, a body frame, a steering wheel having a steering column, an inclosing member pivoted to the frame and carrying a transverse pivot, a handle bar passing through said member and mounted to turn on said pivot, a connecting rod having a swivel connection at one end with the lower end of said handle bar and carrying racks at its other end, a rear axle carrying wheels, and a clutch on said axle constructed to be engaged by said racks and to effect rotation of the axle in one direction only.

In testimony whereof, I have hereunto set my hand at San Francisco, California, this 24th day of September, 1919.

FRED STARR.

In presence of—
P. S. PIDWELL.